United States Patent [19]

Monneraye et al.

[11] 3,912,525

[45] Oct. 14, 1975

[54] LITHIOMZINC BOROSILICATE GLASS SEALING MATERIAL

[75] Inventors: Marc Monneraye, Aubervilliers; Michel Monnier, Paris; Jacques Lantaires, Massy, all of France

[73] Assignee: U.S. Philips Corporation, New York, N.Y.

[22] Filed: Mar. 13, 1974

[21] Appl. No.: 450,725

Related U.S. Application Data

[63] Continuation of Ser. No. 210,353, Dec. 21, 1971, abandoned.

[30] Foreign Application Priority Data

Dec. 30, 1970  France .............................. 70.47222
Dec. 30, 1970  France .............................. 70.47223

[52] U.S. Cl. ................ 106/54; 106/39.6; 106/39.7; 106/48
[51] Int. Cl.² ........................ C03C 3/08; C03C 3/22
[58] Field of Search .............. 106/48, 54, 39.6, 39.7

[56] References Cited
UNITED STATES PATENTS 2,660,531  11/1953  Fraser et al. ........................ 106/48
3,200,310  8/1965   Carman ................................ 106/54
3,312,556  4/1967   Oikawa et al. ....................... 106/54
3,706,579  12/1972  Michael ............................... 106/48
3,752,701  8/1973   Morrissey ............................. 106/54
3,772,043  11/1973  Michael ............................... 106/48

FOREIGN PATENTS OR APPLICATIONS 1,590,777  4/1970  France ................................. 106/54

Primary Examiner—Helen M. McCarthy
Attorney, Agent, or Firm—Frank R. Trifari

[57] ABSTRACT

A sealing material for sealing two ceramic materials or for sealing a metal to a ceramic material which metal may include gold. The starting material for the sealing process includes the following mixture in % by weight: 3–16% of $SiO_2$, 18–41% of $B_2O_3$, 0–7% of $Al_2O_3$, 4.5–10% of $Li_2CO_3$, 33–60% of ZnO and 0–25% of $CaCO_3$ and $SrCO_3$ and $BaCO_3$. The resulting sealing glass includes the following ranges of oxidic components in mol.%: 4–20% of $SiO_2$, 20–45% of $B_2O_3$, 0–5% of $Al_2O_3$, 5–10% of $Li_2O$, 30–55% of ZnO and 0–10% of CaO and SrO and BaO in which the molar ratio ($Li_2O$ + ZnO + alkaline earth oxides) : ($SiO_2$ + $B_2O_3$ + $Al_2O_3$) is equal to or more than 1.

2 Claims, 10 Drawing Figures

LITHIOMZINC BOROSILICATE GLASS SEALING MATERIAL

This is a continuation, of application Ser. No. 210,353, filed Dec. 21, 1971, now abandoned.

The invention relates to a sealing material which may be used particularly for sealing two ceramic materials or for sealing a metal to a ceramic material, which metal preferably consists of gold.

Given embodiments of hybrid circuits, notably those in which a circuitry of gold is partially provided on a ceramic substrate by means of cathode sputtering, are incorporated in a gastight housing of ceramic material. The housing is provided by means of sealing and for this purpose a material is to be available which can be used at a temperature such that the sputtered material satisfactorily adheres to the ceramic material. For the metal commonly used, particularly gold, this temperature is in the order ot 800°C. In addition the material, even when having a slight thickness, must give the joint sufficient strength and gastightness and it must have a satisfactory electrical insulation. The sealing material must have a low viscosity at the sealing temperature, and it must very satisfactorily wet the relevant ceramic material and gold while it must satisfactorily adhere thereto and as regards the coefficient of expansion this material must be suitable and must have a minimum specific electric conductivity.

French Pat. No. 1,590,777 describes a sealing material which partly has the above-described properties and which can be used for welding materials together whose coefficient of expansion lies between $45.10^{-7}°C^{-1}$ and $100.10^{-7}°C^{-1}$ and particularly for sealing two ceramic materials. The material described consists of a devitrifiable glass whose composition lies within the following ranges in mol.%:

$SiO_2$ 9–26
$B_2O_3$ 9–36
$Al_2O_3$ 0–16
CaO+SrO+BaO+MgO 9–56
ZnO+CdO 9–56 in which the overall quantity of CaO+SrO+BaO+MgO+ZnO+CdO is equal to or larger than 50 mol.%.

However, the material described has the drawback that prior to sealing it must be heated for approximately 10 minutes at a temperature of more than 900°C.

For sealing onto a ceramic substrate, which is provided with a gold pattern obtained at least partly by cathode sputtering, it is obvious that such a temperature is inadmissible.

The present invention provides a novel type of sealing material which has the above-mentioned properties and whose sealing temperature is lower than 800°C.

According to the invention the sealing material particularly for joining two ceramic materials or for sealing a metal to a ceramic material consisting of a slightly devitrifiable glass is characterized in that the composition of the starting mixture in % by weight is located within the following range of compositions:

| | |
|---|---|
| $SiO_2$ | 3–16 |
| $B_2O_3$ | 18–41 |
| $Al_2O_3$ | 0–7 |
| $Li_2CO_3$ | 4.5–10 |
| ZnO | 33–60 |
| $CaCO_3+SrCO_3+BaCO_3$ | 0–25 | so that the oxidic composition of the glass obtained in mol % is:

| | |
|---|---|
| $SiO_2$ | 4–20 |
| $B_2O_3$ | 20–45 |
| $Al_2O_3$ | 0–5 |
| $Li_2O$ | 5–10 |
| ZnO | 30–55 |
| CaO+SrO+BaO | 0–10 | in which the molar ratio ($Li_2O+ZnO$ + alkaline earth oxides): ($SiO_2+B_2O_3+Al_2O_3$) is equal to or more than 1.

The specific choice of the sealing material according to the invention within the above-mentioned limits depends on the ceramic substrate material used.

For sealing a ceramic element onto a ceramic substrate having a metal pattern with the aid of a material whose composition is located within the abovementioned limits, a layer of powder of the said material is deposited by means of a suspension on the surface of the ceramic element to be welded and is pre-melted at a temperature of between 800° and 1100°C whereafter the surface of the element supporting the glass layer thus formed is provided on the substrate and the assembly is heated for several minutes at a temperature which is lower than 800°C. This may be effected by heating the assembly for approximately 10 minutes in a furnace at a temperature of between 670°C and 800°C.

This very simple method has the advantage that no shielding atmosphere is required.

In order that the invention may be readily carried into effect some embodiments thereof will now be described in detail by way of example with reference to the accompanying diagrammatic drawings in which.

Figure 1:
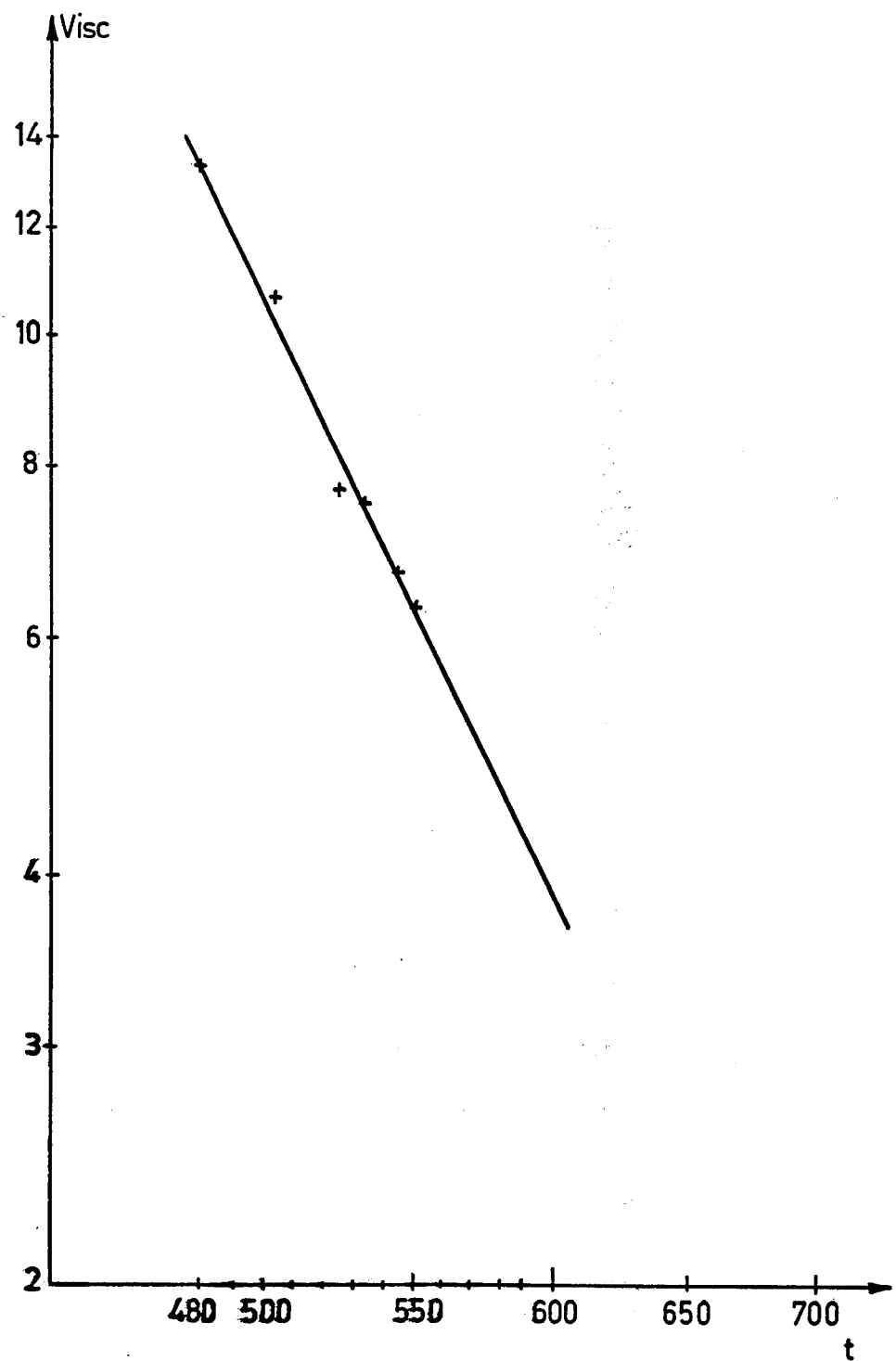
FIG. 1 shows a graph indicating the viscosity as a function of the temperature for a material according to the invention.

Table I shows different compositions (in percent by weight) of vitrifiable mixtures based on oxides and carbonates which lead to sealing materials according to the invention. The molar composition of the materials obtained from the said mixtures are given in Table II.

This table also states for each composition the coefficient of expansion $\alpha$, the temperatures HOt and DTT respectively of the annealing point, which is the temperature at which the viscosity is $10^{13.4}$ poises and the dilatometric transformation temperature which is measured by means of a dilatometer. At the transformation temperature the viscosity in this instrument is $10^{10.6}$ poises. Measurement of the common softening point (viscosity $10^{7.6}$ poises) in accordance with the Littleton method is extremely difficult with such short glasses. These compositions are melted at temperatures of between 1200° and 1450°C after very careful mixing of the starting mixtures.

The molten glass is subsequently converted into frit by pouring in water then preferably by grinding in alcohol so as not to affect the composition so that a powder is obtained which is suitable for sealing.

The strength of joints manufactured with the sealing materials corresponding to the above-described composition was measured by subjecting the test bars manufactured in the manner described hereinafter to a bending test. Two equal bars (diameters 4 mm) of very pure aluminium oxide were sealed with the material to be examined; the glass powder suspended in an organic liquid (alcohol, ethylacetate or amylacetate, etc.) possibly in the presence of a binder (such as collodion) was provided on the end of one of the bars and pre-melted at a temperature in the vicinity of 1000°C. The coated sides of these bars were pressed together and thus heated for 10 minutes at a temperature of between 670° and 800°C. The bars sealed in this way were then subjected to a bending test. To this end the sealed bar was placed between two supports spaced 50 mms apart and subjected to a load on the weld exerted at equal distances from the supports until breakage occurred. The breaking strength is always higher than 18 decanewton sq. mm and in most cases breakage occurred in the ceramic material because the strength of the joint was larger than that of the ceramic material.

Table III shows the results of the mechanical tests which were performed on three glasses shown in Table I.

Table III

| Compositions | 9 | 4 | 5 |
|---|---|---|---|
| Pre-melting temperature | 825 | 1 000 | 1 000 |
| Welding temperature | 780 | 690 a 800 | 780 |
| Breaking strength (decaneton/sq.mm) | >20 | >25 | >25 |
| Breaking frequency in aluminium oxide | 60% | 100% | 00% |

Wetting particularly of very pure aluminium oxide and beryllium oxide by sealing materials according to the invention is eminent. The presence of a metal (particularly gold) on one of the ceramic materials slightly reduces wetting, but joints consisting of the abovedescribed materials provided between a gold-coated ceramic substrate and a ceramic housing are always very strong and gastight.

Figure 2:
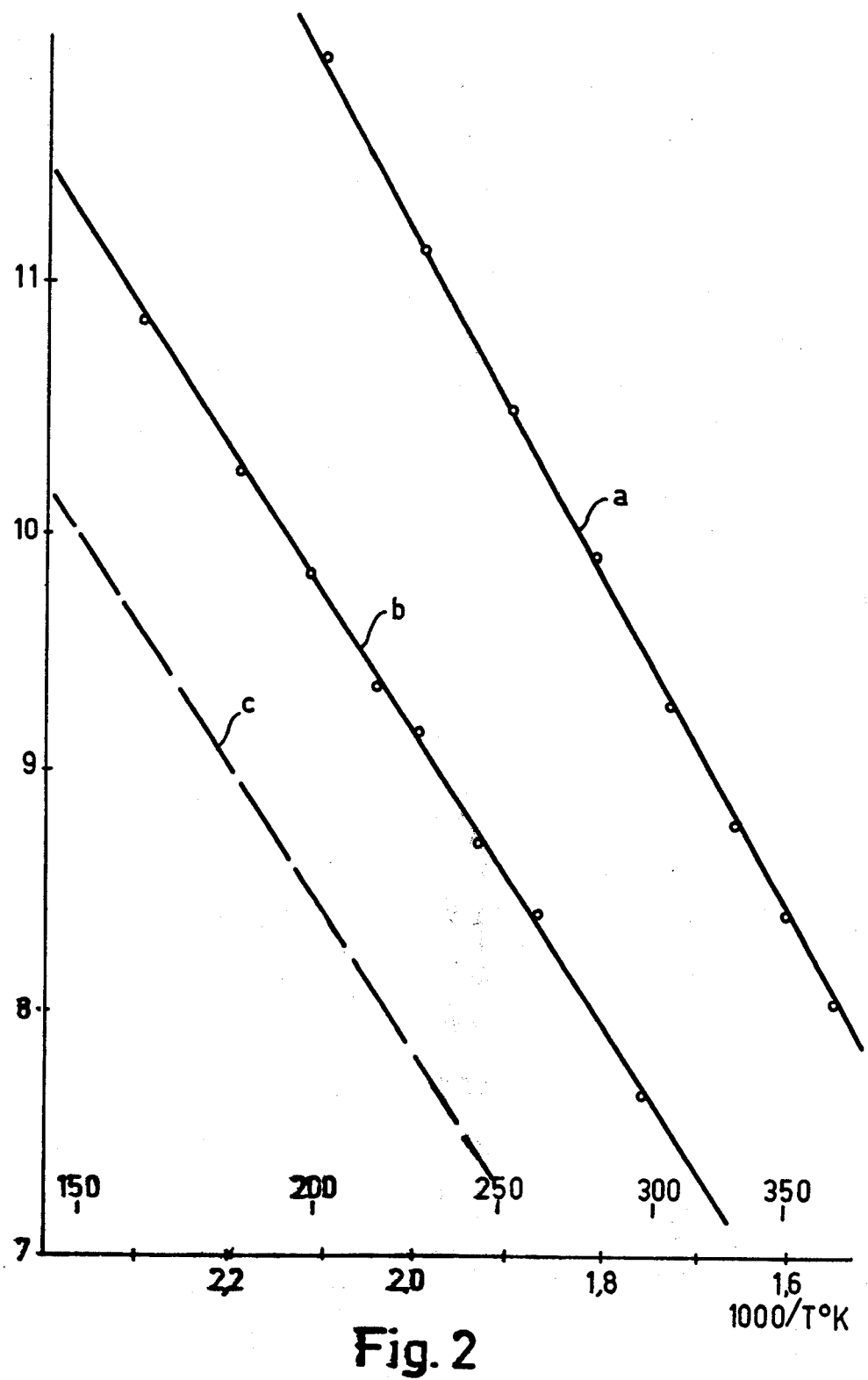
FIG. 2 shows a graph which indicates the specific resistance as a function of the temperature for two materials according to the invention and having different compositions and, by way of comparison, for a known sealing glass.

In addition the glasses according to the invention have a satisfactory specific resistance which in all cases is higher than that of the known sealing glasses. In FIG. 2 curves $a$, $b$, $c$ show the specific resistance as a function of the temperature for the compositions 1 and 3 and for a known sealing glass, respectively.

EXAMPLE 1

Figure 3:
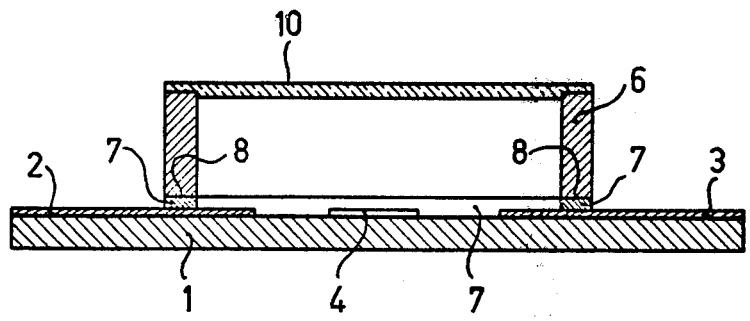
FIG. 3 is a diagrammatical cross-section through a hybrid circuit module having a gold pattern of a ceramic material onto which a ceramic envelope is sealed with the aid of a material according to the invention.
Figure 4:
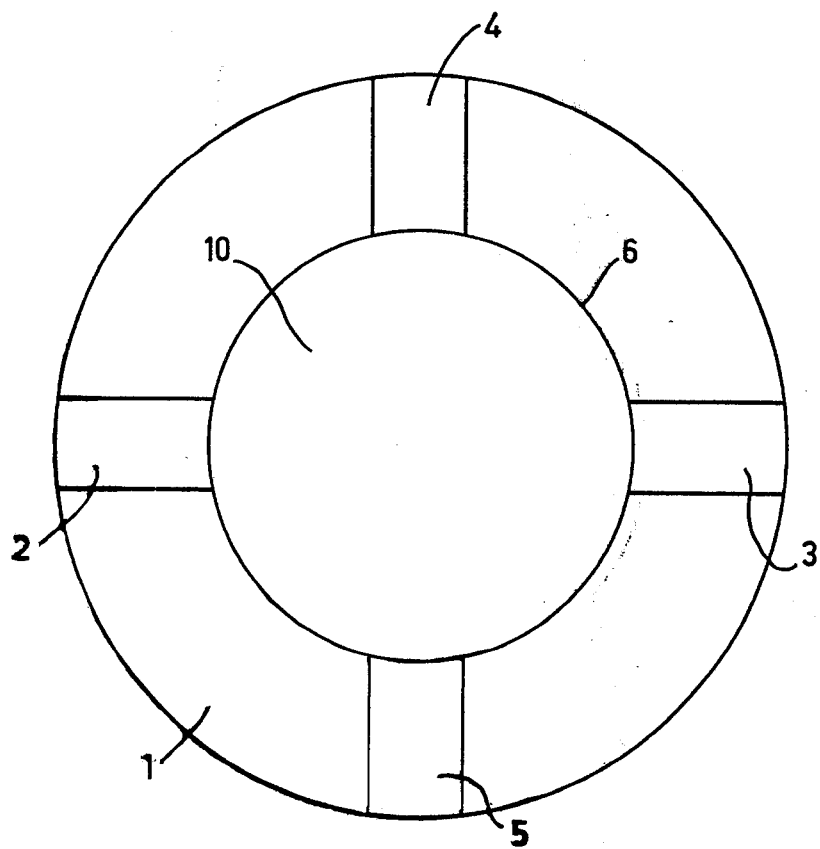
FIG. 4 is a plan view of the same circuit module

FIGS. 3 and 4 diagrammatically show a hybrid circuit having a gold pattern 2, 3 and 4 on a substrate of aluminium oxide 1 which is incorporated in an envelope 6 of aluminium oxide secured onto the substrate.

This is effected with the aid of a ring of the sealing glass 7 for which purpose firstly an even layer of a suspension of the glass powder of composition 5 of Table I is provided on the edge 8 of the envelope 6 which is maintained in a furnace for 10 minutes at a temperature of 1000°C. The edge 8 is wetted by the sealing glass and after cooling the ring 7 is formed. The envelope 6 is then provided on the substrate 1 and again placed in a furnace for 10 minutes at a temperature of Table I

| | 1 | 2 | 3 | 4 | Compositions in % by weight 5 | 6 | 7 | 8 | 9 | 10 |
|---|---|---|---|---|---|---|---|---|---|---|
| $SiO_2$ | 7.9 | 8.1 | 11.9 | 4.0 | 7.8 | 7.7 | 4.0 | 7.9 | 7.6 | 7.4 |
| $B_2O_3$ | 27.4 | 32.7 | 23.0 | 37.2 | 34.9 | 34.5 | 32.3 | 27.5 | 34.1 | 25.7 |
| $Al_2O_3$ | — | — | 6.8 | — | — | — | — | — | — | — |
| $BaCO_3$ | — | — | — | — | — | — | — | — | — | 12.2 |
| $CaCO_3$ | 6.6 | — | — | — | — | 6.4 | — | 6.6 | 12.7 | — |
| $Li_2CO_3$ | 4.8 | 9.9 | 9.8 | 9.9 | 9.6 | 9.5 | 9.8 | 9.7 | 9.4 | 4.55 |
| ZnO | 53.3 | 49.3 | 48.5 | 48.9 | 47.7 | 41.9 | 53.9 | 48.3 | 36.2 | 50.15 |

Table II

| | 1 | 2 | 3 | 4 | Compositions in mol.% 5 | 6 | 7 | 8 | 9 | 10 |
|---|---|---|---|---|---|---|---|---|---|---|
| $SiO_2$ | 10 | 10 | 15 | 5 | 9.65 | 9.65 | 5 | 10 | 9.6 | 10 |
| $B_2O_3$ | 30 | 35 | 25 | 40 | 37.25 | 37.25 | 35 | 30 | 37.25 | 30 |
| $Al_2O_3$ | — | — | 5 | — | — | — | — | — | — | — |
| BaO | — | — | — | — | — | — | — | — | — | 5 |
| CaO | 5 | — | — | — | — | 4.8 | — | 5 | 9.65 | — |
| $Li_2O$ | 5 | 10 | 10 | 10 | 9.65 | 9.65 | 10 | 10 | 9.7 | 5 |
| ZnO | 50 | 45 | 45 | 45 | 43.45 | 38.65 | 50 | 45 | 33.8 | 50 |
| $\alpha(10^{-7}°C^{-1})$ | 58.5 | 59 | 60 | 63 | 63.5 | 66.5 | 68 | 69.5 | 71 | 61.5 |
| HOT (°C) | 490 | 485 | 475 | 480 | 480 | 485 | 470 | 460 | 490 | 485 |
| DTT (°C) | 515 | 505 | 500 | 505 | 505 | 515 | 490 | 490 | 520 | 505 |

780°C. Since no special atmosphere at all is required, all these operations are effected in air.

The envelope 6 is subsequently closed by a cover 10 in accordance with known techniques (metallisation, resistance percussive soldering thermocompression etc.).

EXAMPLE 2

Figure 5:
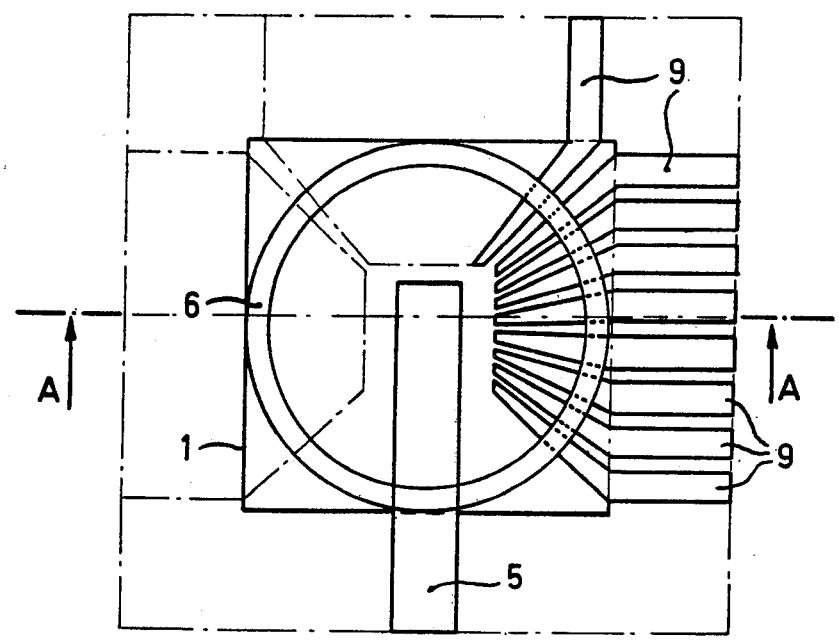
FIG. 5 is a plan view of a hybrid circuit module having a metal pattern provided by welding
Figure 6:
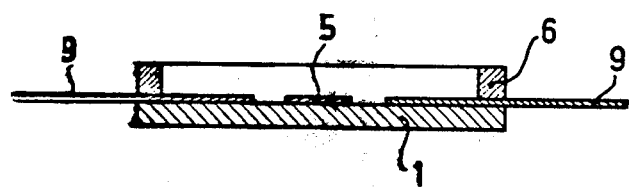
FIG. 6 is a cross-section through the circuit module shown in FIG. 5.

The circuit unit of FIGS. 5 and 6 is manufactured in accordance with a different technique. However, the same reference numerals are used for all corresponding elements.

A metal pattern 9 of Dilver P, i.e. an alloy of iron, nickel and cobalt which is manufactured by etching is secured onto a substrate of aluminium oxide 1 with the aid of a sealing material as described in French Pat. No. 1,590,777 at a temperature of approximately 1000°C in an atmosphere of hydrogen-containing nitrogen 25% of which is saturated with water vapour at room temperature.

The circuit is protected in the same manner as in the previous example with the aid of an envelope of ceramic material 6 which is sealed onto the substrate with the aid of material having composition 4 of Table I by pre-melting the material at a temperature of 1000°C, by subsequently sealing it for 6 minutes at a temperature of 760°C which treatment does not affect the adhesion of the metal pattern to the substrate.

EXAMPLE 3

Figure 7:
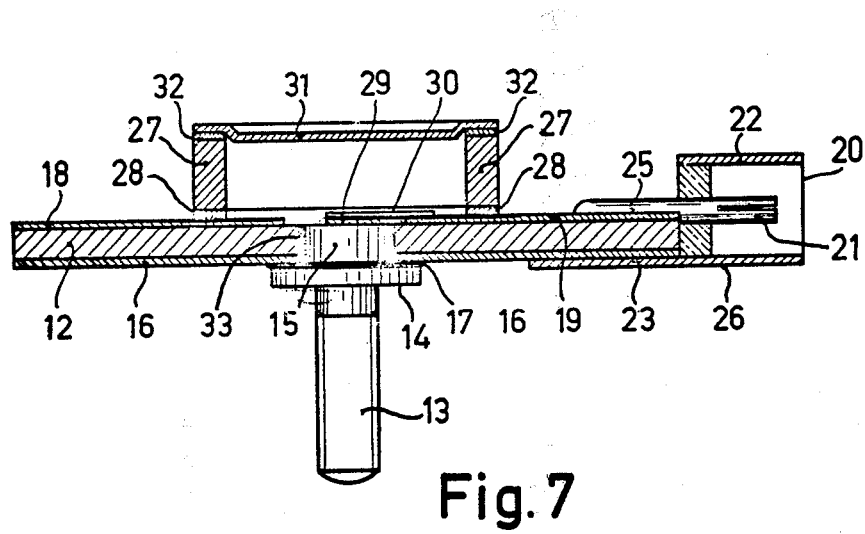
FIG. 7 is an elevational view and partly a cross-section through the assembly of a hybrid circuit.
Figure 8:
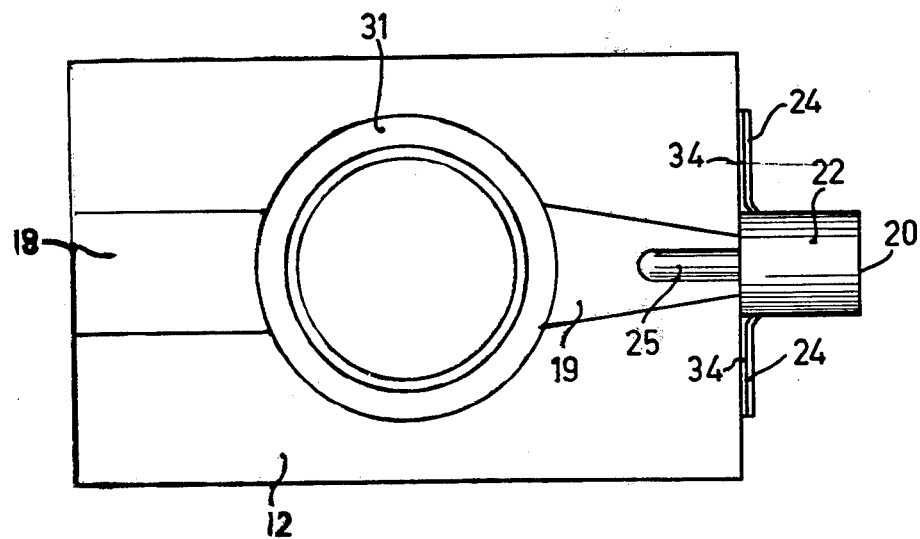
FIG. 8 is a plan view of the assembly of an enveloped circuit which is shown in an elevational view and in a cross-section.

The hybrid circuit for ultra-high frequencies according to FIGS. 7 and 8 is manufactured on a plate of ceramic material 12 which is supported by a central metal component 13 with the aid of which it is possible to secure the assembly to a component consisting of metal having a high thermal conductivity and being able to conduct away the evolved heat. The plate 12 is preferably manufactured of very pure aluminium oxide whose $Al_2O_3$-content is, for example, between 99.5 and 99.9%, or of beryllium oxide of the same quality. In this example the central metal component 13 includes a collar 14 and a head 15. The head 15 is present in a hole of the plate 12 onto which it is sealed with the aid of a glass layer 33 of composition 5 of Table I. The component 13 is manufactured of an alloy of iron, nickel and cobalt such as the known alloys having a low coefficient of expansion and being known under the names KOVAR, DILVER P and FERNICO.

The lower surface of the plate 12 is coated with a gold layer 16 whose thickness is, for example, approximately 10 microns and which is in satisfactory electrical contact with the component 13, for example, through a percussive-soldering ring 17 consisting of a eutectic alloy of gold and germanium or of gold and silicon.

The tracks 18 and 19 which consist of adhering gold on the plate 12 are provided on the upper surface of this plate. The conductor 18 together with the gold layer 16 and the dielectric formed by the plate 12 constitutes a short propagation line. The conductor 19 whose width decreases from the inside to the outside constitutes, together with the layer 16, a further flat, short propagation line having a characteristic impedance which increases from the outside, where a coaxial minature connection 20 is present, to the inside.

The coaxial miniature connection 20 consists of an axial central part 21 and a cylindrical outer part 22. The outer part 22 corresponds to the "mass" of the ultra-high frequency circuit and is electrically connected to the adherent gold layer 16 through a flat arm 23 which is welded or soldered onto the said layer. The outer part 22 is also provided with two side arms 24 which are visible in FIG. 8 and which are sealed onto the straight edge of the plate by means of a glass layer 34 of composition 5.

The central part 21 extends into a part 25 which includes a flat wedge for the purpose of welding or soldering onto the conductor 19. An insulating collar 26 is used for correct centration of the part 21 relative to part 22. The central part 21 and the part 22 are made of one of the above-mentioned iron-nickel-cobalt alloys and are gold-plated in order to ensure a satisfactory high-frequency surface conductivity.

A ring 27 of the same ceramic material as the material of the plate 22 is sealed onto the upper surface of the said plate and onto the conductors 18 and 19 which support this plate by means of a glass sealing ring according to the invention which is denoted by the reference numeral 28. The ring also consists of sealing glass of composition 5 of Table I. To this end the sealing glass is first pulverised and subsequently a liquid paste is made of it by suspending the glass powder in an organic liquid such as a volatile hydrocarbon, an alcohol, ethylacetate or amylacetate to which a binder may be added such as stearic acid or a collodion; subsequently a thin even layer of this paste is provided on one of the edges of the ring 27 and after evaporation of the binder ring 27 is introduced into a furnace for approximately 10 minutes at a temperature in the order of 1000°C so that the glass melts and the glass ring 28 starts to flow out. Thus a very rigidly adherent glass layer is obtained by a re-action between the glass and the aluminium oxide.

Subsequently the ring is sealed onto the plate 12 with the adhering gold pattern by passing it for approximately 10 minutes through a furnace at a temperature of 780°C.

A self-oscillating diode 29 is provided within the space surrounded by the ring 27, which diode is sealed by means of thermocompression onto the upper surface of the head 15 and a conductor 30 which connects the upper contact of the diode 29 to the conductor 19.

The upper edge of the ring 27 of ceramic material is metallised or prefrably coated with an adhering gold layer of a thickness in the order of 2 to 3 microns. A metal cover 31 which is made of a thin gold-plated disk of an iron-nickel-cobalt alloy is welded onto the upper edge of the ring 27, for example, by means of a ring 32 of a gold-germanium soldering metal.

EXAMPLE 4

Figure 9:
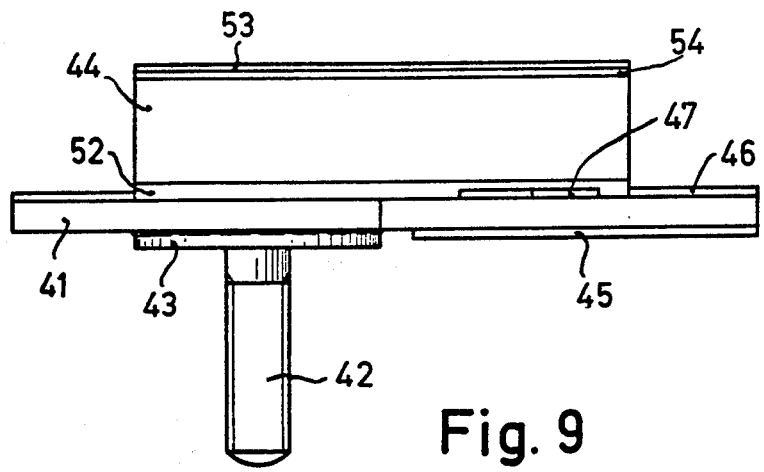
FIG. 9 is an elevational view of the assembly of a hybrid circuit.
Figure 10:
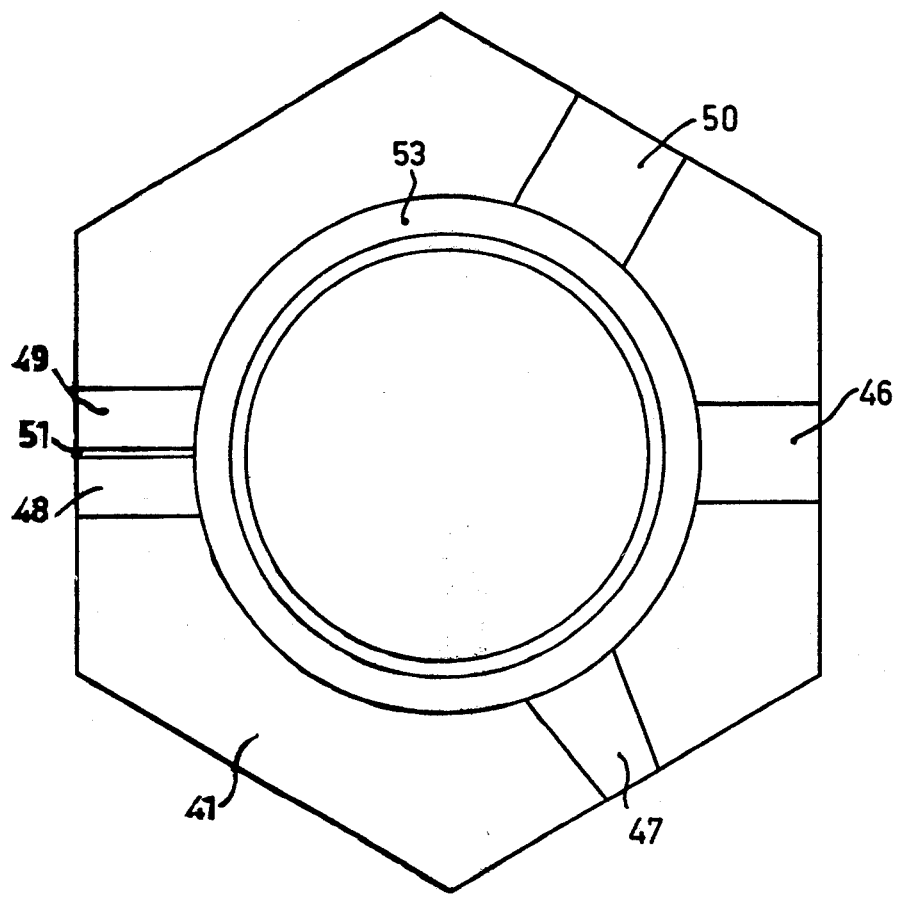
FIG. 10 is a plan view of the assembly of the enveloped circuit which is shown in an elevational view in FIG. 9.

The hybrid circuit for ultra-high frequencies according to FIGS. 9 and 10 is manufactured on a plate of ceramic material 41 which is supported by a metal part 42 with the aid of which the assembly can be secured to a metal part which conducts away the evolved heat rapidly. The part 42 is provided with a wide flat head 43 for sealing the plate 41 onto the part 42. The plate 41 and the flat head 43 may particularly be sealed during sealing of a ring of ceramic material 44 onto the upper surface of the said plate and by using a sealing glass of the same composition.

The lower surface of the plate 41 is provided with an adhering gold layer 45 having a thickness of approximately 10 microns which covers a part of the said surface and constitutes a mass contact. The upper surface of the plate 41 is provided with adhering conductors of gold which are denoted by the reference numerals 46, 47, 48 49 and 50.

The conductors 46, 47 and 50 together with the adhering gold layer 45 and the ceramic material of the plate 41 constitute short flat transmission lines. The conductors 48 and 49 which are separated by a narrow slot 51 constitute a transmission slot line whose manufacture is possible by using ion masking prior to etching the upper surface of the plate 41 and after strengthening the thickness of the gold by means of electrolysis at those areas which correspond to the conductors 46, 47, 48, 49 and 50. The accuracy and the acuity of the edges of the conductors 48 and 49 makes it possible to obtain a gap having a regular width of 10 microns which is, for example, compatible with the method of working with a slot line.

The above-mentioned ring of ceramic material 44 is secured onto the plate 41 through a glass sealing ring 52 and the upper edge of the ring 44 is provided with an adhering gold layer. A cover 53 of a gold-plated iron-nickel-cobalt alloy is welded onto the upper edge of the ring 44 through a ring 54 of a gold-germanium welding material.

The glass of the ring 52 is obtained from the starting composition 4 of Table I.

The said general method of manufacturing the ultra-high frequency hybrid circuits according to FIGS. 7 and 8 applies to the manufacture of the integrated circuits according to FIGS. 9 and 10 and the use of a slightly different sealing glass which involves small modifications. Premelting and flowing of the sealing glass onto the wide flat head 43 of the part 42 and onto the lower edge of the ring 44 may likewise be performed by a 10-minute treatment in a furnace whose temperature is adjusted at 1000°C; the above-mentioned parts are sealed by passing them through a furnace for approximately 10 minutes at a temperature of 760°C.

What is claimed is:

1. A sealing material particularly for sealing two ceramic materials together or for sealing a metal to a ceramic material consisting of a slightly devitrifiable glass which comprises $SiO_2$, $B_2O_3$, alkaline earth metal oxides, ZnO and optionally $Al_2O_3$, said glass consisting essentially of the following ranges of oxidic compositions in mol. %:

| | |
|---|---|
| $SiO_2$ | 4 – 20 |
| $B_2O_3$ | 20 – 45 |
| $Al_2O_3$ | 0 – 5 |
| $Li_2O$ | 5 – 10 |
| ZnO | 30 – 55 |
| CaO+SrO+BaO | 0 – 10 | in which the molar ratio ($Li_2O$+ZnO+ alkaline earth oxides): ($SiO_2$+$B_2O_3$+$Al_2O_3$) is equal to or more than 1.

2. A starting mixture for preparing a sealing material used in a method of sealing two ceramic materials together or for sealing a metal to a ceramic material by employing a sealing glass derived from said starting mixture, said starting material consisting essentially of the following range of compositions in % by weight:

| | |
|---|---|
| $SiO_2$ | 3 – 16 |
| $B_2O_3$ | 18 – 41 |
| $Al_2O_3$ | 0 – 7 |
| $Li_2CO_3$ | 4.5 – 10 |
| ZnO | 33 – 60 |
| $CaCO_3$+$SrCO_3$+$BaCO_3$ | 0 – 25. |

* * * * *

UNITED STATES PATENT AND TRADEMARK OFFICE
CERTIFICATE OF CORRECTION

PATENT NO. : 3,912,525
DATED : October 14, 1975
INVENTOR(S) : MARC MONNERAYE ET AL It is certified that error appears in the above-identified patent and that said Letters Patent are hereby corrected as shown below:

On the Title Page, section [54], change "LITHIOMZINC" to --LITHIOM ZINC--

Column 1, line 1, change "LITHIOMZINC" to --LITHIOM ZINC--

Column 3, line 2, change "HOt" to --HOT--

Column 4, in Table III, delete and correct as follows:

Table III

| Compositions | 9 | 4 | 5 |
|---|---|---|---|
| Pre-melting temperature | 825 | 1,000 | 1,000 |
| Welding temperature | 780 | 690 - 800 | 780 |
| Breaking strength (decaneton/sq.mm) | >20 | >25 | >25 |
| Breaking frequency in aluminum oxide | 60% | 100% | 100% |

Signed and Sealed this eighteenth Day of May 1976

[SEAL]

Attest:

RUTH C. MASON
*Attesting Officer*

C. MARSHALL DANN
*Commissioner of Patents and Trademarks*